(No Model.)
E. MANSFIELD.
CANT DOG.
No. 259,564. Patented June 13, 1882.
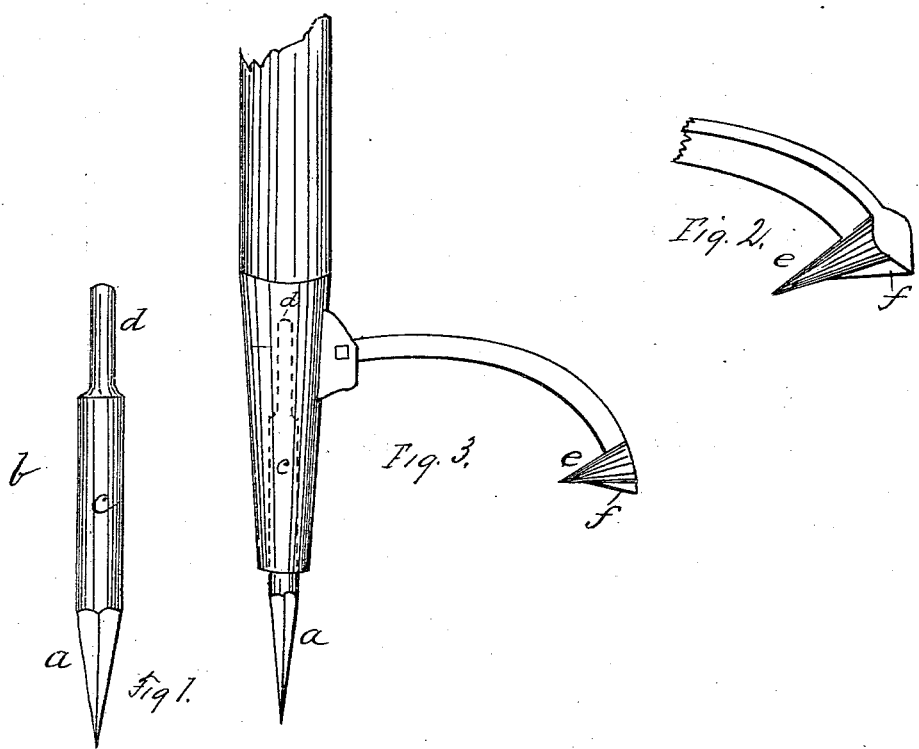
Witness
Otto F. Young
Frederick M. Laughton
Inventor
Edward Mansfield
By Wm Franklin Peavy
Atty

UNITED STATES PATENT OFFICE.

EDWARD MANSFIELD, OF ORONO, MAINE.

CANT-DOG.

SPECIFICATION forming part of Letters Patent No. 259,564, dated June 13, 1882.

Application filed December 19, 1881. (No model.)

*To all whom it may concern:*

Be it known that I, EDWARD MANSFIELD, of Orono, in the county of Penobscot and State of Maine, have invented certain new and useful Improvements in Cant-Dogs; and I do hereby declare that the following is a full, clear, and exact description of the invention, that will enable others skilled in the art to which it appertains to make and use the same, reference being had to the accompanying drawings, forming a part of this specification, in which—

Figure 1 shows a view of my pick-point; Fig. 2, a view of hook; Fig. 3, a view of cant-dog complete.

Same letters show like parts.

My invention consists of certain improvements in cant-dogs, designed to more effectually secure the pick-point to the pole or stock, and also to enable the dog to be more easily and quickly removed from the log when desired.

My invention will be readily understood by reference to the accompanying drawings, in which Fig. 1 shows a side view of my improved pick-point. The point $a$ is made of any desired shape. The shank $b$, which enters the stock, consists of two portions, $c\ d$, both substantially cylindrical in form, but varying in size, the upper part, $d$, being of less diameter than the part $c$. This form enables the pick to be driven into the stock, a hole of the proper size and shape being first made, without the use of heat, which chars and weakens the fibers of the wood, and its cylindrical shape prevents its becoming loose as readily as when the taper shank is used.

The shape of my improved dog is shown in Fig. 2. The back of the hook $e$ is formed with a triangular rib at $f$, extending about two-thirds of the distance to the point. This rib or projection serves two purposes—increasing the weight of the end of the hook and giving its back a steeper "pitch"—both facilitating the extraction of the hook from the log.

I do not claim a knife-tang retained in place by solder, as shown in the patent of White, No. 53,546, March 27, 1866, whatever its form or construction. My invention relates to cant-dogs or like implements, and is designed to obviate the necessity of heating the pick in order to fit and drive it to its place in the stock, as is now commonly done. Nor do I claim the devices shown in the Hills patent, No. 244,057. My hook is round, or nearly so, throughout its length, as shown, but is provided, in addition, with the triangular rib upon its back, thus not only preserving the ordinary weight at the extremity of the dog, but adding both to said weight and to the pitch, as before stated. Hills, on the contrary, shows a hook square or diamond-shaped in cross-section, chamfered off at the top, thus decreasing the weight, and showing no increase of pitch over the ordinary form of dog.

What I claim as my invention is—

1. In a cant-dog, the improved pick-point having its shank formed of two substantially cylindrical portions adapted to be driven into the wood of the stock without previous heating, and held in place by the contraction of the fibers, in combination with said stock and surrounding ferrule, substantially as set forth.

2. In a cant-dog, the hook $e$, round, or nearly so, in cross-section, and formed with the triangular rib $f$ upon its back, as and for the purposes described.

In testimony that I claim the foregoing I have hereunto set my hand this 15th day of December, 1881.

EDWARD MANSFIELD.

Witnesses:
OTTO F. YOUNGS,
WM. FRANKLIN SEAVEY.